United States Patent [19]
Roberge

[11] Patent Number: 5,289,744
[45] Date of Patent: Mar. 1, 1994

[54] APPARATUS AND METHOD FOR INSTALLING TOP BEAM "C" CLAMPS OR THE LIKE

[76] Inventor: Ronald O. Roberge, 1521 Shenandoah Dr., Cedar Park, Tex. 78613

[21] Appl. No.: 790,213

[22] Filed: Nov. 8, 1991

Related U.S. Application Data

[63] Continuation-in-part of Ser. No. 532,437, Jun. 4, 1990, Pat. No. 5,063,652.

[51] Int. Cl.⁵ .............................................. B25B 13/06
[52] U.S. Cl. .................................. 81/124.5; 81/124.7; 81/125; 81/55
[58] Field of Search .......................... 81/124.3–124.7, 81/125, 55; 29/272

[56] References Cited

U.S. PATENT DOCUMENTS

| | | | |
|---|---|---|---|
| 1,089,249 | 3/1914 | Moose | 81/124.5 |
| 1,654,319 | 12/1927 | Brown | 81/55 X |
| 3,314,316 | 4/1967 | Finkle | 81/55 |
| 5,035,162 | 7/1991 | Dougherty | 81/124.6 X |

Primary Examiner—D. S. Meislin
Attorney, Agent, or Firm—Pravel, Gambrell, Hewitt, Kimball & Krieger

[57] ABSTRACT

An apparatus is adapted for enabling a worker to install a top beam "C" clamp on a roof or ceiling beam, or to remove a previously installed clamp, without having to climb up to the level of the beam. The apparatus includes a structure for supporting the clamp and for positioning the clamp in an installation position on the beam or other suitable member. A socket assembly is associated with the clamp supporting structure and is adapted to drive either the clamp bolt or the nut received on the bolt when the clamp is properly supported on the clamp supporting structure. A driving assembly is connected to the socket assembly to enable the operator of the apparatus to rotate or drive the sockets to rotate either the clamp bolt or the nut received on the bolt. The socket assembly is adapted to be positioned through the driving assembly in either a bolt driving position or a nut driving position in which the bolt and nut, respectively, are properly engaged for driving.

9 Claims, 3 Drawing Sheets

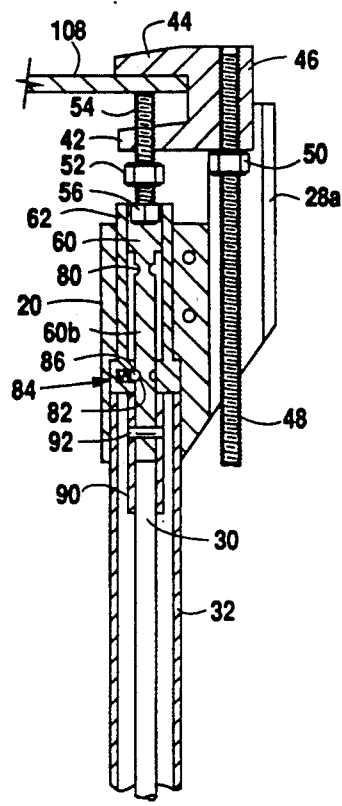
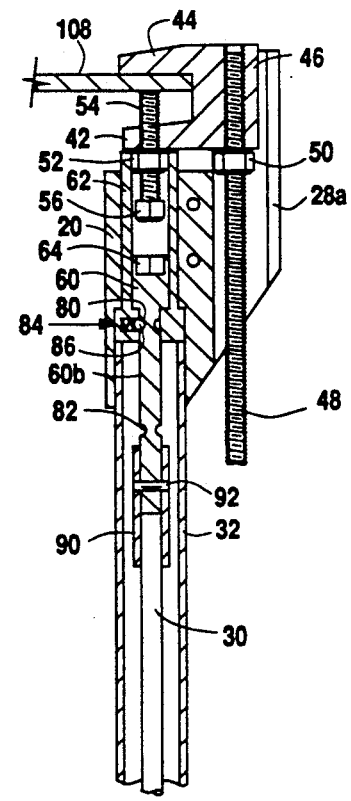
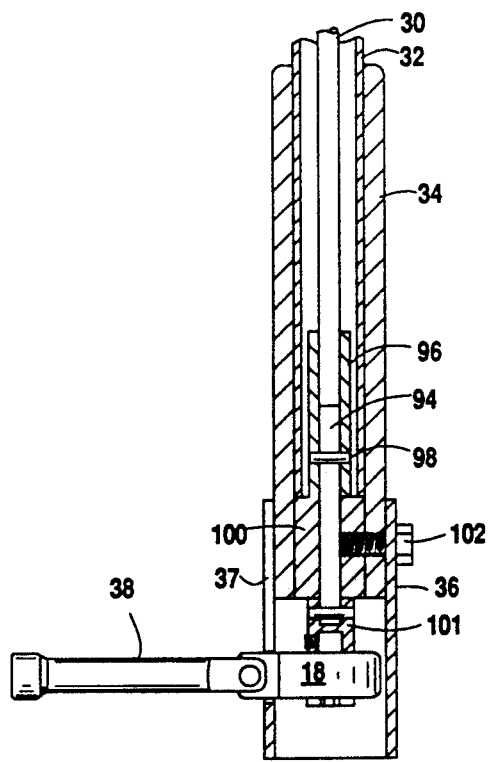
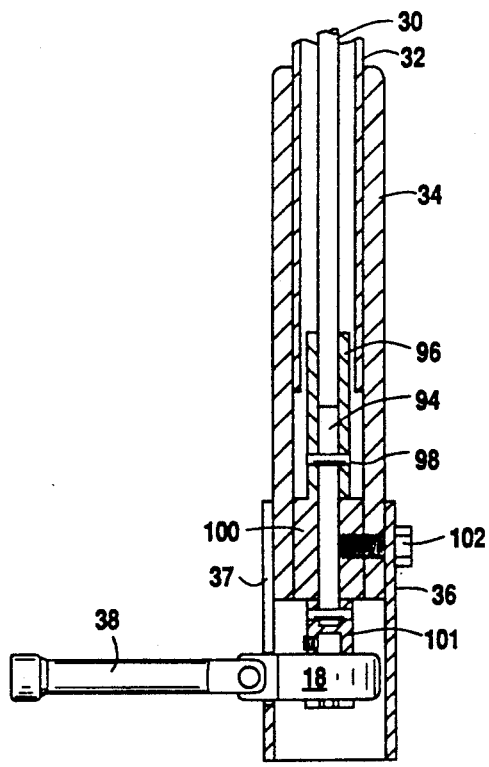
Fig. 6    Fig. 7

APPARATUS AND METHOD FOR INSTALLING TOP BEAM "C" CLAMPS OR THE LIKE

CONTINUING APPLICATION DATA

This application is a continuation-in-part of application Ser. No. 07/532,437, filed on Jun. 4, 1990, now U.S. Pat. No. 5,063,652.

FIELD OF THE INVENTION

The present invention relates generally to the field of wrenches which operate a bolt and locking nut assembly. More specifically, the present invention relates to an apparatus for operating, installing, and retrieving clamps which use a bolt and locking nut assembly.

BACKGROUND

Construction trades often install top beam "C" clamps for suspending pipe hanger and equipment supports. A top beam "C" clamp includes a bolt jaw and an opposing jaw are connected by a body section to form generally a "C" shape. The body section includes a provision for all-thread rod which is attached to roof and ceiling structural members to suspend the supports. The clamp is installed by rotating a clamp bolt to thread through the bolt jaw and force the structural member against the opposing jaw. Once the structural member has been gripped by the bolt and the opposing jaw, a clamp locking nut is threaded to lock the bolt position within the bolt jaw, thereby securing the grip.

Installation or retrieval of a top beam "C" clamp generally requires a worker to hold the clamp while rotating the clamp bolt or the clamp locking nut. In order to install a top beam "C" clamp at an elevated location, it is often necessary for the worker to use a ladder or worker platform, resulting in increased installation time and potential risk to the worker.

Both the installation and retrieval operations result in inefficiency and potential risk for the worker. There is a need to install and retrieve top beam "C" clamps without the need for climbing a ladder or work platform. The present invention provides an apparatus which increases worker efficiency and reduces the use of a ladder or work platform.

SUMMARY OF THE INVENTION

The apparatus of the present invention overcomes the difficulties of the prior art by providing an efficient means for operating, installing, or retrieving top beam "C" clamps or similar devices that use a bolt and locking nut assembly. In particular, the apparatus of the present invention supports the top beam "C" clamp and enables the worker to rotate the clamp bolt and to rotate the clamp locking nut. The apparatus is constructed to allow the worker to operate the clamp over an extended distance.

The apparatus of the present invention includes clamp supporting means for receiving the top beam "C" clamp and holding the clamp for operation; socket means for engaging and for rotating the clamp bolt, and for engaging and for rotating the clamp locking nut; and driving means for moving the socket means. The clamp supporting means includes clamp receiving means and an extension member. The extension member is of a sufficient length to allow the worker to operate the clamp from an extended distance. The socket means includes a first socket opening for engaging the clamp bolt and a second socket opening for engaging the clamp locking nut. The driving means includes a connection to the socket means.

To use the apparatus for operating a clamp, the worker brings together the top beam "C" clamp and the clamp supporting means. The head of the clamp bolt is received in the first socket opening of the socket means. The worker then rotates the driving means to cause rotation of the socket means thereby rotating the clamp bolt to cause gripping of the structural member. Once the structural member is gripped, the socket means is moved to cause the second socket opening to engage the locking nut. The worker then rotates the driving means to cause rotation of the locking nut to a locked position wherein the structural member is securely gripped by the clamp. During the rotation of both the clamp bolt and the locking nut, there is a tendency for the clamp body to rotate. This rotational tendency is counteracted by a cradle assembly which limits rotation of the clamp.

To retrieve a top beam "C" clamp, the locking nut is loosened by engaging and rotating the locking nut with the second socket opening and thereafter engaging and rotating the clamp bolt with the first socket opening. In an alternative method to retrieve a top beam "C" clamp, the worker engages the clamp locking nut with the socket means and then rotates the locking nut until the locking nut engages the head of the clamp bolt thereby causing rotation thereof. The rotation of the clamp bolt releases the grip of the clamp on the structural member thereby allowing the clamp to be removed.

The preferred form of the invention includes socket position controlling means. The first and second socket opening for engaging the clamp bolt and for engaging the clamp locking nut, respectively, remain in contact with the bolt while the clamp bolt is rotated and remain in contact with the clamp locking nut while the clamp locking nut is rotated. The socket position controlling means includes a detention system to help maintain the selected socket opening engaging at least one member of the bolt and locking nut assembly. The detention system controls the position of the socket assembly in the apparatus. In using the preferred embodiment of the apparatus the worker may simultaneously hold the top beam "C" clamp for operation and maintain the socket means engagement with the bolt and locking nut assembly.

BRIEF DESCRIPTION OF THE DRAWINGS

FIG. 6 is a somewhat representational view in partial longitudinal section similar to FIG. 5, showing the apparatus together with a top beam "C" clamp with the first socket opening engaged with the clamp bolt.

FIG. 7 is a somewhat representational view in partial longitudinal section similar to FIG. 6 but with the second socket opening engaged with the clamp locking nut.

DETAILED DESCRIPTION OF THE PREFERRED EMBODIMENT

Figure 1:
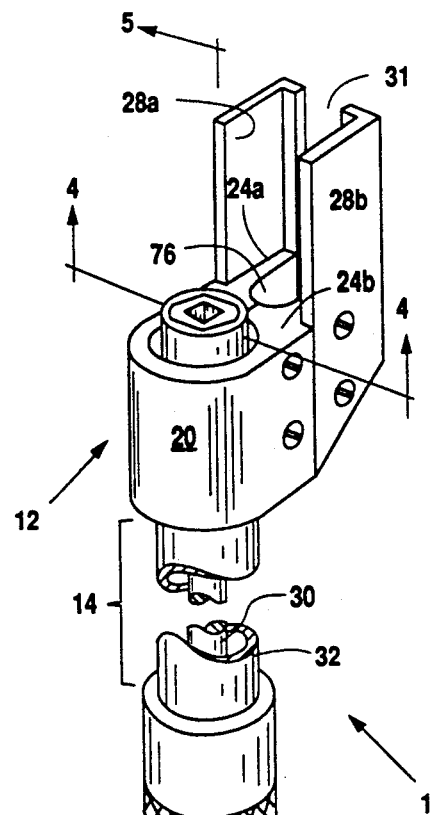
FIG. 1 is a view in perspective of an apparatus embodying the principles of the invention for operating, installing, or retrieving top beam "C" clamps.
Figure 1:
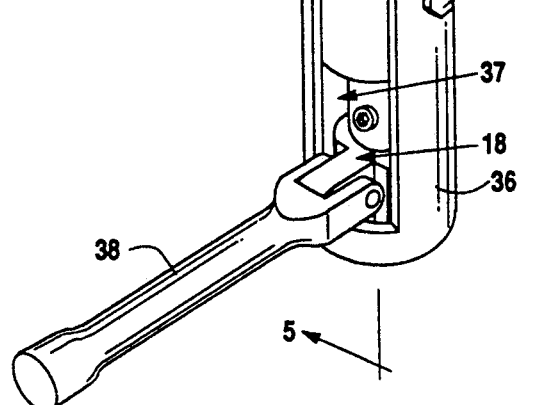

FIG. 1 is a perspective view of a preferred embodiment of the apparatus 10 for operating top beam "C" clamps in accordance with the present invention. The apparatus is broadly comprised of a clamp operating head 12, a central extension section 14, a grip assembly 16, and a wrench assembly 18. The clamp operating head includes a socket housing 20 having a socket assembly 22 rotatably received therein. The socket housing 20 comprises a pair of prongs 24a and 24b having a slot 26 therebetween for receiving a portion of a top beam "C" clamp (hereinafter "clamp"). A clamp receiving cradle is defined by first and second cradle fingers 28a and 28b, respectively. A clamp to be operated by the apparatus is received in the slot 31 between the cradle fingers and the slot 26 between the prongs 24a and 24b, as will be discussed in greater detail below. The central extension section 14 comprises a tubular extension member 32 which has a drive shaft 30 passing therethrough to operate the socket assembly 22. A handle grip 34 rotatably received on the tubular extension member 32 provides a grip for the worker and further is operably connected to the driveshaft to move the socket assembly 22 in a manner discussed in greater detail below. The socket assembly 22 is rotated by the driveshaft 30 which is controlled by a ratchet wrench 18. The ratchet wrench is surrounded by a sheath 36 attached to the lower end of the grip 34, with the handle 38 of the wrench extending through a slotted opening 37 in the sheath 36.

Figure 2:
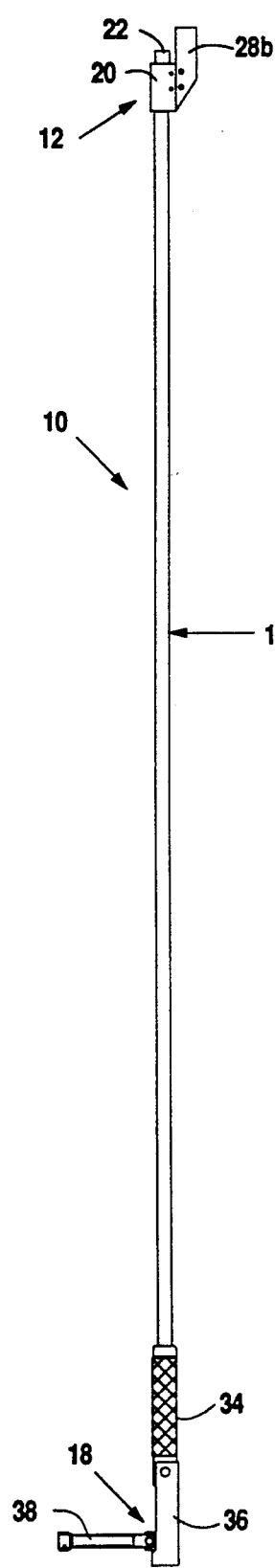
FIG. 2 is a view in side elevation of the apparatus shown in FIG. 1 but drawn to a reduced scale sufficient to show the entire extension member.

FIG. 2 is an elevational side view of the apparatus 10 of the present invention, showing the relative proportion of the various components. The central extension section 14 has sufficient length to allow a worker to substantially increase his reach when installing a clamp at extended heights. In the preferred embodiment of the present invention the apparatus has a length of between 8 and 10 feet.

Figure 3:
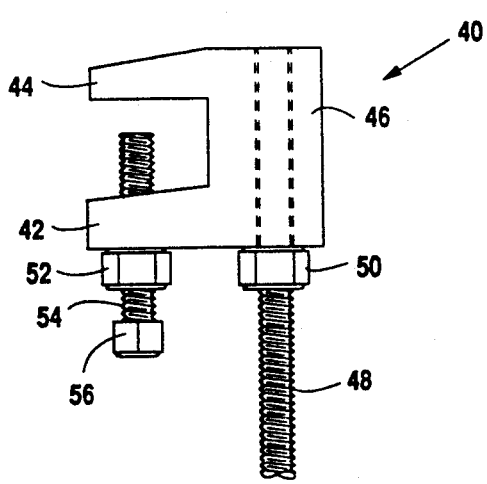
FIG. 3 is a view in side elevation of a top beam "C" clamp.

FIG. 3a is side elevation view of a prior art top beam "C" clamp of the type installed using the present invention. The clamp 40 includes a bolt jaw 42 and an opposing jaw 44 which are connected by a body section 46 to form generally a "C" shape. The clamp 40 attaches all-thread rod 48 to roof and ceiling structural members. A locking nut 50 is shown securing the all-thread rod 48 in a provision of the body section 46. The clamp 40 also includes a bolt and locking nut assembly. A clamp locking nut 52 is threaded on a clamp bolt 54 prior to threading the bolt and locking nut assembly into the bolt jaw 42. The clamp bolt 54 is engaged and rotated by its bolt head 56, which typically has a square cross section. The clamp locking nut 52 is engaged and rotated by its outer diameter which is larger than the clamp bolt head 56. Rotating the clamp bolt 54 to thread in the bolt jaw 42 produces screw action force. When the clamp bolt 54 is threaded through the bolt jaw 42 towards the opposing jaw 44 any member fitting between the bolt jaw 42 and the opposing jaw 44 is gripped as screw action force pushes the member against the opposing jaw 44. Rotating the clamp locking nut 52 to contact the bolt jaw 42 locks the bolt and locking nut assembly.

Figure 4:
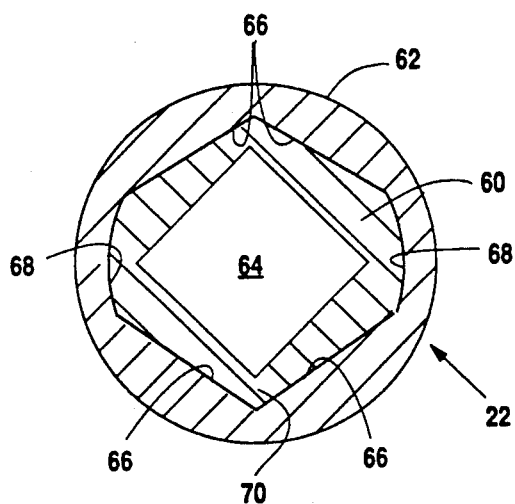
FIG. 4 is a view in longitudinal section taken along line 4—4 in FIG. 1.

FIG. 4 is a cross sectional view of the socket assembly taken along lines 4—4 of FIG. 1. The assembly comprises an inner socket 60 which is slidably received in an outer socket 62. In the preferred embodiment, the inner socket has a square opening 64 for engaging the head 56 of the clamp bolt 54, although other configurations could be used to adapt the inner socket for use with other types of bolt heads. The outer socket of the preferred embodiment comprises flat surfaces 66, at an angle appropriate for engaging a hexagonal nut, and curved surfaces 68. When engaged with the locking nut 52, the flat surfaces 66 will be in contact with four of the six faces of the nut, but the curved surfaces 68 will not engage the surfaces of the nut. The contact of the four faces 66 with the corresponding four faces of the nut 52 is sufficient to allow the outer socket 62 to rotate the nut. The curved surfaces 68 allow the complementary curved portions of the inner socket to have increased thickness to provide increased strength. More specifically, referring to FIG. 4, it can be seen that two of the corners of the opening 64 are aligned with the vertexes of the flat faces 66 and two of the corners are located at midpoints of the curved surfaces 68. The thickness of the inner socket wall illustrated by reference numeral 70 is comparatively thin while the thickness of the socket wall illustrated by reference numeral 72 is comparatively thick. It has been found that the configuration of the inner and outer sockets 60 and 62 shown in FIG. 4 significantly strengthens the inner socket 60.

Figure 5:
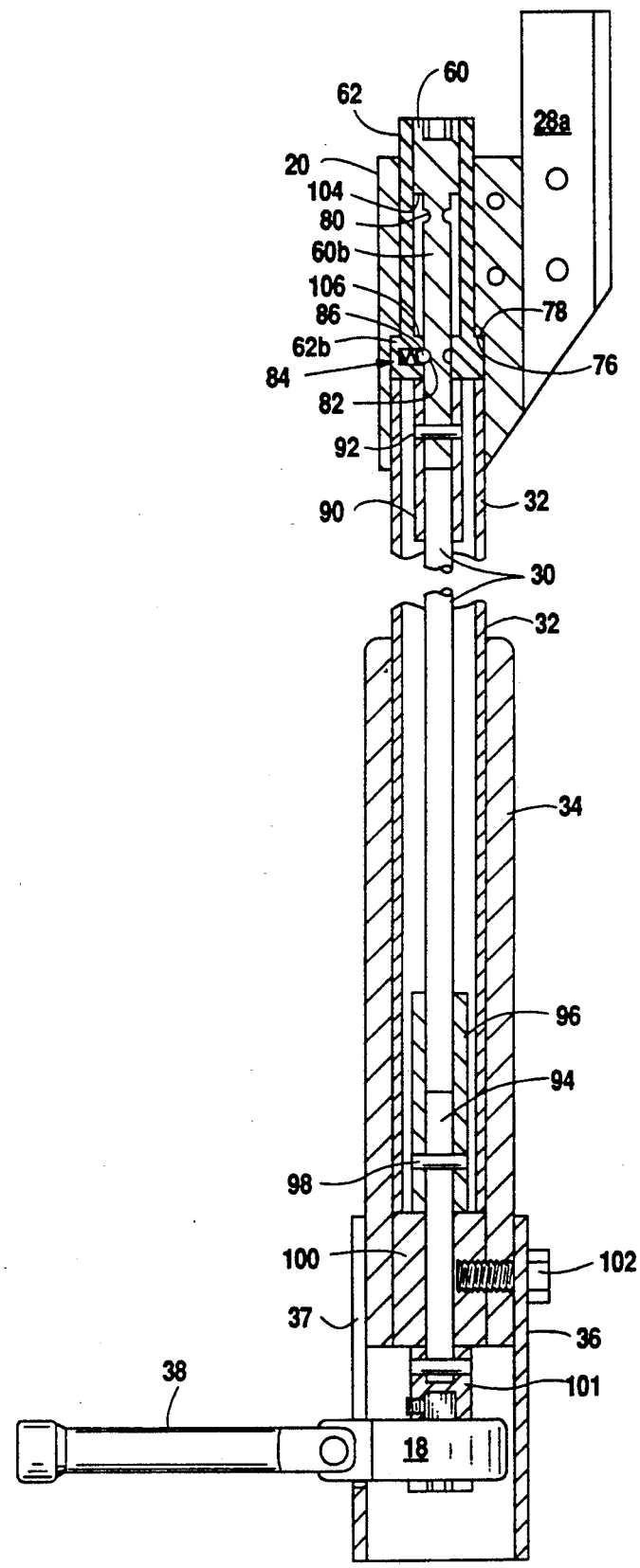
FIG. 5 is a view in longitudinal section taken along line 5—5 in FIG. 1.

FIG. 5 is an elevational side view showing a cross section of the upper and lower portions of the apparatus of the present invention. The socket assembly 22 comprises inner and outer sockets 60 and 62, respectively, having features discussed above. The outer socket 62 has a base portion 62b of increased thickness. The outer socket 62 is rotatably retained in the socket housing 20 by contact of the shoulder 76 of the base portion 62b with shoulder 78 of the inner bore of the socket housing, as shown in FIG. 5.

Referring again to FIG. 5, it can be seen that the inner socket 60 is slidably received in the outer socket 62 and is movable between first and second positions to allow the socket assembly to selectively engage the clamp bolt head 56 or the locking nut 52, in a manner discussed in greater detail below. The inner socket 60 comprises a shaft 60b having an upper groove 80 and a lower groove 82. A plurality of spring loaded ball assemblies 84 in the base portion 62b of the outer socket 62 contain balls 86 which are received in lower groove 82 or upper groove 80 to releasably secure the inner socket 60 in either the first or the second position, respectively. The lower portion of the shaft 60b is operably connected to the driveshaft 30 by a construction sleeve 90. The shaft 60b is shown to be secured in the sleeve by a pin 92. The drive shaft 30 can also be pinned to the sleeve or can be glued, depending on the type of material used to construct the drive shaft. The lower portion of the drive shaft 30 is operably connected to a ratchet wrench shaft 94 by a construction sleeve 96, with the wrench shaft 94 being secured within the sleeve by a pin 98. The wrench shaft 94 passes through a bore in cylindrical bushing 100 and is attached to the ratchet assembly 18 by a coupling sleeve 101. The ratchet wrench 18 is surrounded by a tubular sheath 36 which has a slotted opening 37 to allow operation of the wrench handle 38. The tubular sheath 36 is attached to the grip 34 by at least one bolt 102 which is secured in the bushing 100.

As was discussed previously, the grip 34 and all of the components secured to the grip by the bolt 102 are capable of rotating with respect to the tubular extension member 32. Furthermore, the grip 34 and the components attached thereto can slide longitudinally with respect to the tubular extension member 32 to move the socket assembly between first and second positions. The socket assembly 22 is releasably secured in the first or the second position by the spring ball-groove detention system discussed above. However, the travel of the socket assembly in the upward direction is limited by contact of the upper surface of the bushing 100 with the lower end of the tubular extension member 32, as shown in FIGS. 5 and 6. Furthermore, the travel of the socket assembly in the downward direction is limited by contact of shoulder 104 of inner socket 60 with the shoulder 106 on the base portion 62b of outer socket 62.

Referring to FIG. 6, the clamp 40 is gripping a roof or ceiling structural member 108. The clamp bolt 54 is forcing the member 108 against the opposing jaw 44. Referring to FIG. 7, the clamp locking nut 52 is shown contacting the bolt jaw 42 to lock the bolt and locking nut assembly and secure the grip.

The operation of the apparatus 10 and the method of the invention may now be described with particular reference to FIGS. 6 and 7. To install a clamp such as clamp 40, the method includes first positioning the clamp in a clamp operating position by inserting the clamp bolt head 56 into the opening 64 in inner socket 60, with the clamp body portion 46 received between cradle fingers 28a and 28b and with the threaded rod member 48 being received in the slot 26 between prongs 24a and 24b (FIG. 1). The method next includes holding the clamp in an installation location on the structural member 108 where the clamp is to be installed. The apparatus, which may be 8-10 feet or more in length, allows the worker operating the apparatus 10 to easily hold the clamp 40 in a clamp operating position and install it in an installation location without having to climb a ladder or a work platform to the member 108.

With the clamp 40 held in the installation location on the member 108, the method of the invention next includes rotating the head 56 of the clamp bolt 54 with the inner socket 60 to drive or tighten the bolt to the position shown in FIG. 6. The step of rotating the inner socket 60 includes rotating the drive shaft 30. The step of rotating the drive shaft 30 may be accomplished by rotating the grip 34 and/or the handle 38 of the ratchet wrench 18. However, any suitable means for engaging and rotating the drive shaft may be employed.

After the clamp bolt 56 is tightened to the desired position, the method of the invention next includes engaging the locking nut 52 with the outer socket 62, and then rotating the socket means until the nut is in the position on the bolt as shown in FIG. 7. In order to engage the clamp locking nut 52, the inner socket 60 must be moved to a retracted position relative to the outer socket body 62. In this retracted position, the inner socket body 60 is drivingly engaged with the outer socket body 62, but it is retracted from the distal end of the outer socket body sufficiently to allow the outer socket body opening to rotate the clamp locking nut 52. Rotating the drive shaft 30 rotates the inner socket body 60 which imparts the rotational force to the outer socket body 62 so that it may drive the locking nut 52. Once the clamp locking nut 52 is tightened, the apparatus 10 may be withdrawn leaving the clamp 40 properly installed on the structural member 108. In the illustrated form of the invention the position of the inner socket 60 relative to the outer socket 62 is controlled by the spring ball detention means discussed above and by the travel limits determined by the contact of the bushing 100 with the tubular extension member 32 and the contact of the shoulders 104 and 106 (FIG. 5) also discussed above.

The above described preferred embodiments are intended to illustrate the principles of the invention, but not to limit the scope of the invention. Various other embodiments and modifications to these preferred embodiments may be made by those skilled in the art without departing from the scope of the following claims. Although the method of the invention is described particularly for installing top beam "C" clamps, those skilled in the art will readily appreciate that the steps may be reversed for removing a previously installed clamp. Also, devices other than top beam "C" clamps may be operated with the apparatus and method of the invention. The design of the apparatus lessens the difficulty of the operation and distancing the worker from the operation reduces the use of ladders and work platforms. Although the preferred form of the invention helps dedicate the apparatus to operating, installing, and retrieving top beam "C" clamps, the scope of the invention includes forms for various clamps which use the bolt and locking nut assembly.

Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. An apparatus for installing, retrieving, or operating a clamp having a bolt and locking nut assembly in which a clamp bolt and a clamp locking nut are threaded by socket means, the apparatus comprising:
   clamp supporting means for receiving and holding the clamp in a clamp operating position;
   socket means rotatably connected to the clamp supporting means, said socket means having a bolt driving position and a nut driving position, the socket means for drivingly engaging the bolt of the bolt and locking nut assembly when in the bolt driving position and for drivingly engaging the nut of the bolt and locking nut assembly when in the nut driving position; and
   driving means connected to the socket means for rotating the socket means when in the bolt driving position to rotate the clamp bolt, and for rotating the socket means when in the nut driving position to rotate the clamp locking nut threaded on the clamp bolt.

2. The apparatus of claim 1 wherein the apparatus further comprises:
   socket position controlling means for selectively retaining the socket means in the bolt driving position and for selectively retaining the socket means in the nut driving position.

3. The apparatus of claim 2 wherein the clamp supporting means comprises:
   an elongated extension member;
   socket housing means connected to a distal end of the elongated extension member, said socket housing means for housing and rotatably retaining the socket means; and
   clamp receiving means connected to the socket housing means, said clamp receiving means for receiving and holding the clamp in a clamp operating position adjacent to the socket housing means, with the head of the clamp bolt received in the socket means when the socket means is in the bolt driving position, and with the clamp locking nut received in the socket means when the socket means is in the nut driving position.

4. The apparatus of claim 3 wherein the socket means comprises:

outer socket means rotatably mounted in the socket housing means said outer socket means for drivingly engaging the locking nut of the clamp received in the clamp receiving means; and inner socket means slideably received in the outer socket means and positioned in an extended position when the socket means is in the bolt driving position and a retracted position relative to the outer socket means when the socket means is in the nut driving position, the inner socket means for drivingly engaging the head of the clamp bolt when in the extended position and for drivingly engaging the outer socket means when in the retracted position.

5. The apparatus of claim 4 wherein the driving means further includes:

an elongated drive shaft having a distal end connected to the socket means to rotate the socket means when the drive shaft is rotated about its longitudinal axis.

6. The apparatus of claim 5 wherein the socket position controlling means comprises:

upper and lower circumferential grooves formed in a portion of said inner socket means; and means for engaging said lower groove to releasably retain the socket means in a first position for rotating the head of the clamp bolt and means for engaging said upper groove to releasably retain the socket means in a second position for rotating the clamp locking nut.

7. The apparatus of claim 6 wherein the outer socket means comprises:

an elongated outer socket body;

an outer socket opening extending longitudinally through the outer socket body, the outer socket opening having a non-circular cross sectional shape extending from a distal end of the outer socket body, said outer socket opening for receiving the clamp locking nut to drive the clamp locking nut when the outer socket body is rotated about its longitudinal axis; and retaining means associated with the outer socket means to retain the outer socket body in the socket housing while enabling the outer socket body to rotate about its longitudinal axis.

8. The apparatus of claim 7 wherein the inner socket means comprises:

an elongated inner socket body;

an inner socket opening extending longitudinally through at least a portion of the inner socket body and having a non-circular cross sectional shape extending from a distal end of the inner socket body, the inner socket opening for receiving the head of the clamp bolt to drive the clamp bolt when the inner socket body is rotated about its longitudinal axis;

an inner socket outer cross sectional shape for drivingly engaging the outer socket opening; and a proximal end of the inner socket body connected to the distal end of the drive shaft.

9. The apparatus of claim 8 wherein:

the elongated extension member comprises an elongated tube; and the drive shaft extends through the tubular extension member.

* * * * *